US012407986B2

(12) United States Patent
Ren et al.

(10) Patent No.: US 12,407,986 B2
(45) Date of Patent: Sep. 2, 2025

(54) SOUNDING DEVICE

(71) Applicant: AAC Microtech (Changzhou) Co., Ltd., Changzhou (CN)

(72) Inventors: Zhang Ren, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 253 days.

(21) Appl. No.: 18/301,277

(22) Filed: Apr. 17, 2023

(65) Prior Publication Data

US 2024/0073620 A1 Feb. 29, 2024

Related U.S. Application Data

(63) Continuation of application No. PCT/CN2022/120143, filed on Sep. 21, 2022.

(30) Foreign Application Priority Data

Aug. 30, 2022 (CN) ........................ 202222298836.7

(51) Int. Cl.

| | |
|---|---|
| ***H04R 9/02*** | (2006.01) |
| ***H04R 7/18*** | (2006.01) |
| ***H04R 9/04*** | (2006.01) |
| ***H04R 9/06*** | (2006.01) |

(52) U.S. Cl.

CPC ............... *H04R 9/025* (2013.01); *H04R 7/18* (2013.01); *H04R 9/045* (2013.01); *H04R 9/06* (2013.01); *H04R 2400/07* (2013.01); *H04R 2400/11* (2013.01)

(58) Field of Classification Search

CPC .......... H04R 7/18; H04R 9/025; H04R 9/045; H04R 9/06; H04R 2400/07; H04R 2400/11

See application file for complete search history.

(56) References Cited

U.S. PATENT DOCUMENTS

2018/0132033 A1* 5/2018 Lee .......................... H04R 3/14

FOREIGN PATENT DOCUMENTS

CN 113596686 A * 11/2021 ............. H04R 9/041

* cited by examiner

*Primary Examiner* — Sunita Joshi
(74) *Attorney, Agent, or Firm* — Wiersch Law Group

(57) ABSTRACT

The present disclosure provides a sounding device having a first frame; a first vibration system including a first diaphragm and a first voice coil; and a magnetic circuit system with a first magnetic gap and a second magnetic gap. The sounding device further includes a second vibration system having a second diaphragm and a second voice coil, and a conductive insertion member. The total bending length of both ends of the voice coil wire can be controlled by adjusting the winding process of the second voice coil, so that the purpose of adjusting the amplitude of the second vibration system is achieved for facilitating the adjustment of the amplitude of the second vibration system.

9 Claims, 2 Drawing Sheets

SOUNDING DEVICE

FIELD OF THE PRESENT DISCLOSURE

The present disclosure relates to the field of electro-acoustic transducers, in particular to a sounding device.

DESCRIPTION OF RELATED ART

The sounding device is a transducer device that converts electrical signals into acoustic signals. It is mainly divided into two modes: single vibration system and dual vibration system. Wherein, the sounding device in the dual vibration system mode mainly includes a frame, a first vibration system fixed on the frame, a magnetic circuit system fixed on the frame and a second vibration system fixed to the first vibration system.

In the existing sounding device in dual vibration system mode, the second vibration system needs to be set in the central area of the magnetic circuit system, so it cannot be directly connected to the frame, Correspondingly, its voice coil cannot be electrically connected to the external circuit board through the elastic component which is installed on the frame and conducts electricity. Therefore, the main problem is to ensure the amplitude of the second vibration system can be adjusted on the premise that the voice coil of the second vibration system is electrically connected to the external circuit board.

Therefore, it is necessary to provide a new sounding device to solve the above technical problem.

SUMMARY OF THE PRESENT DISCLOSURE

The purpose of the present disclosure is to provide a sounding device, wherein, the voice coil of the second vibration system is electrically connected to the external circuit board, the amplitude-adjustable dual vibration system mode of the second vibration system can be guaranteed.

Accordingly, the present disclosure provides a sounding device, including: a first frame; a magnetic circuit system fixed on the first frame; a first vibration system having a first diaphragm with an outer peripheral edge fixed to the first frame and a first voice coil for driving the first diaphragm to vibrate for generating sound; a first magnetic gap formed at one side of the magnetic circuit system close to the first vibration system, in which the first voice coil is inserted and suspended; a second magnetic gap formed at the side of the magnetic circuit system close to the first vibration system and being surrounded by the first magnetic gap; a second frame fixed on a top of the magnetic circuit system; a second vibration system including a second diaphragm with an outer peripheral edge fixed to a side of the second frame away from the magnetic circuit system, and a second voice coil inserted and suspended in the second magnetic gap for driving the second diaphragm to vibrate; and, a conductive insertion member fixed to the magnetic circuit system and penetrating the magnetic circuit system from one side of the magnetic circuit system away from the first vibration system to the other side for connecting an external electrical signal. Both the first and second magnetic gaps are disposed around the conductive insertion member; a voice coil lead wire of the second voice coil is drawn out from an inner peripheral side and extended to be electrically connected to the conductive insertion member.

The conductive insertion member includes an insertion member body penetrating the magnetic circuit system from the side of the magnetic circuit system away from the first vibration system to the other side, and two conductive sheets penetrating the insertion member body from one side of the insertion member body close to the second vibration system to the other side; one ends of the two conductive sheets close to the second vibration system are respectively fixed to the top end of the insertion member body and spaced apart to form a welding pad of the conductive insertion member; the voice coil lead wire of the second voice coil is electrically connected to the welding pad.

The magnetic circuit system comprises a magnetic yoke fixed on the first frame and a magnetic assembly fixed on the magnetic yoke; the magnetic yoke includes a bottom wall with a through hole, and a side wall bent and extended from an outer peripheral side of the bottom wall; the magnetic assembly includes a first primary magnet, a pole plate and a second primary magnet which are all annular and are stacked and fixed on the bottom wall of the magnetic yoke.

The pole plate includes an annular pole plate body sandwiched between the first primary magnet and the second primary magnet, and a side wall of the pole plate which is bent in a direction away from the bottom wall of the magnetic yoke from the inner peripheral side of the pole plate body; the first primary magnet, the pole plate and the second primary magnet are set coaxially. The conductive insertion member is inserted through the through hole of the bottom wall of the magnetic yoke; the first primary magnet and the side wall of the magnetic yoke are spaced apart to form the first magnetic gap, the second primary magnet and the side wall of the pole plate are spaced apart to form the second magnetic gap; the second frame is fixed to the side of the second primary magnet away from the pole plate body.

The magnetic assembly further includes an annular auxiliary pole plate stacked on the side of the second primary magnet away from the pole plate body; the inner peripheral side of the second frame is fixedly connected to the outer peripheral side of the auxiliary pole plate.

The first diaphragm comprises a first suspension, a second suspension engaged with an inner side of the first suspension, and a first vibration part extending from an inner peripheral edge of the first suspension and connected to an outer peripheral edge of the second suspension; the outer peripheral edge of the first suspension is fixed to the first frame, the inner peripheral edge of the second suspension is fixed to the side of the second primary magnet away from the first primary magnet; the first voice coil is fixed on the side of the first vibration part close to the magnetic circuit system.

The inner peripheral edge of the second suspension is fixedly connected to the outer peripheral side of the second frame. The first vibration system further includes a skeleton having an annular skeleton body, and a fixing part extending from an inner peripheral edge of the skeleton body to the first magnetic gap and fixedly connected with the first voice coil; the skeleton body is fixed to the first vibration part for serving as a first dome.

The skeleton further includes a connection part bending and extending an outer peripheral edge in a direction close to the magnetic circuit system; the first vibration system further includes an elastic support assembly having an elastic member with one end thereof fixed to the first frame and the other end fixed to the connection part of the skeleton, and an auxiliary diaphragm attached to the side of the elastic member away from the connection part of the skeleton.

The second diaphragm includes a second vibration part, an annular third suspension formed by the outer peripheral edge of the second vibration part extending outward, and a second dome that fits the second vibration part; the outer peripheral edge of the third suspension is fixed to the side of the second frame away from the second primary magnet; the second voice coil is fixed to the second vibration part.

The second diaphragm further includes a second skeleton which is annular and fixed to the second vibration part; the second skeleton is located on the side of the second vibration part close to the magnetic circuit system; the second dome is located on the side of the second vibration part away from the magnetic circuit system; the second voice coil is fixed on the side of the second skeleton close to the magnetic circuit system.

Compared with the existing technology, the sounding device of the present disclosure is additionally provided with a conductive insertion member running through the magnetic circuit system. The voice coil lead wire of the second voice coil in the second vibration system is drawn out from its inner peripheral side and extended to be electrically connected to the conductive insertion member. In this way, the second voice coil can be electrically connected to the external circuit board through the conductive insertion member, the total extension length of both ends of the voice coil wire can be controlled by adjusting the winding process of the second voice coil, thereby adjusting the amplitude of the second vibration system.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Figure 1:
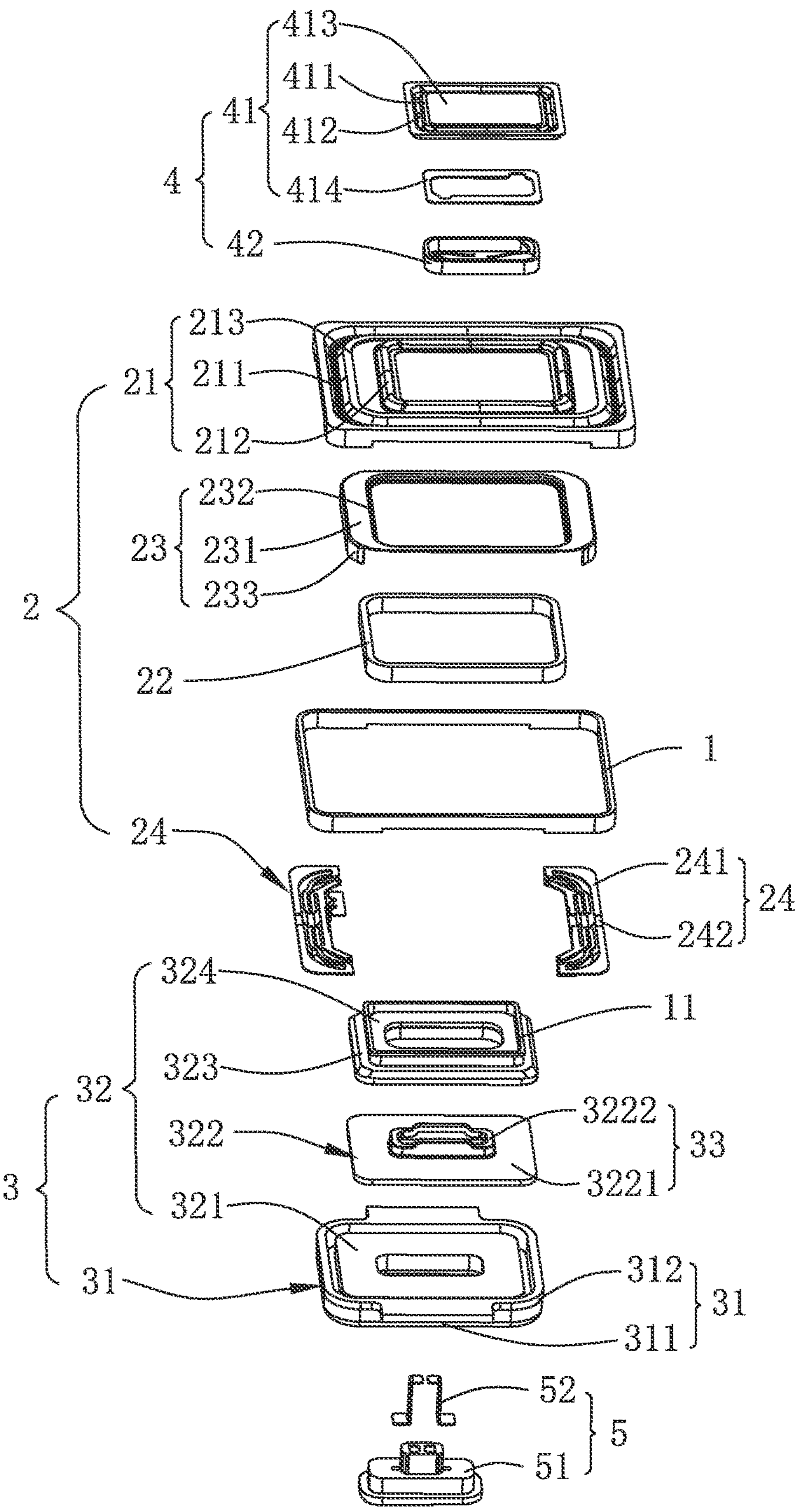
FIG. 1 is an isometric and exploded view of a sounding device provided by an embodiment of the present disclosure.
Figure 2:
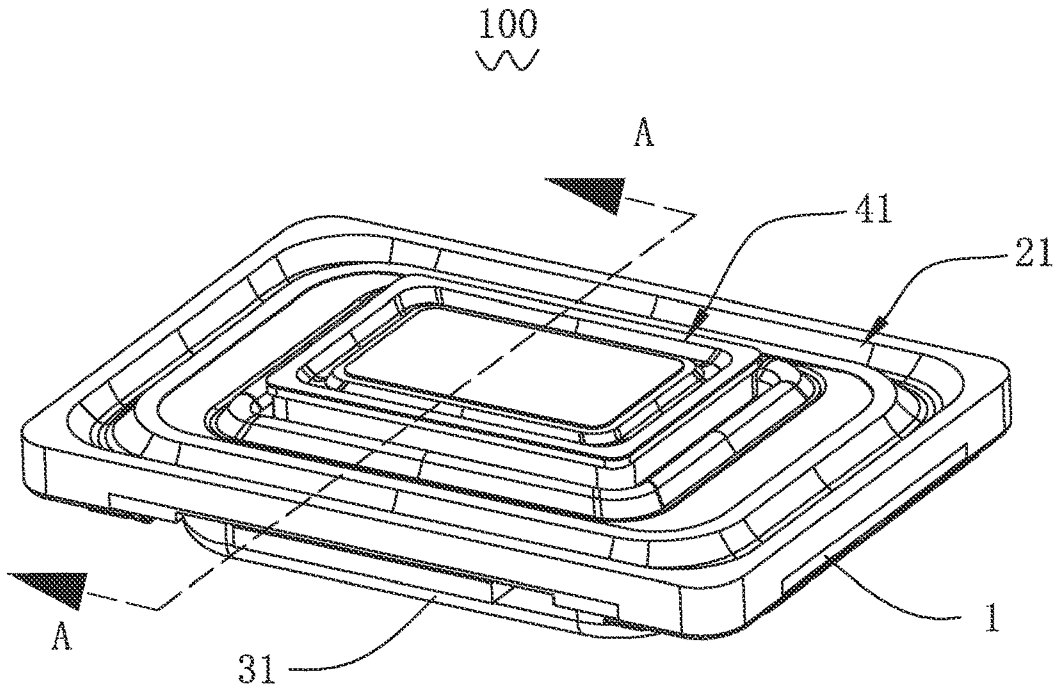
FIG. 2 is an isometric view of the sounding device in FIG. 1.
Figure 3:
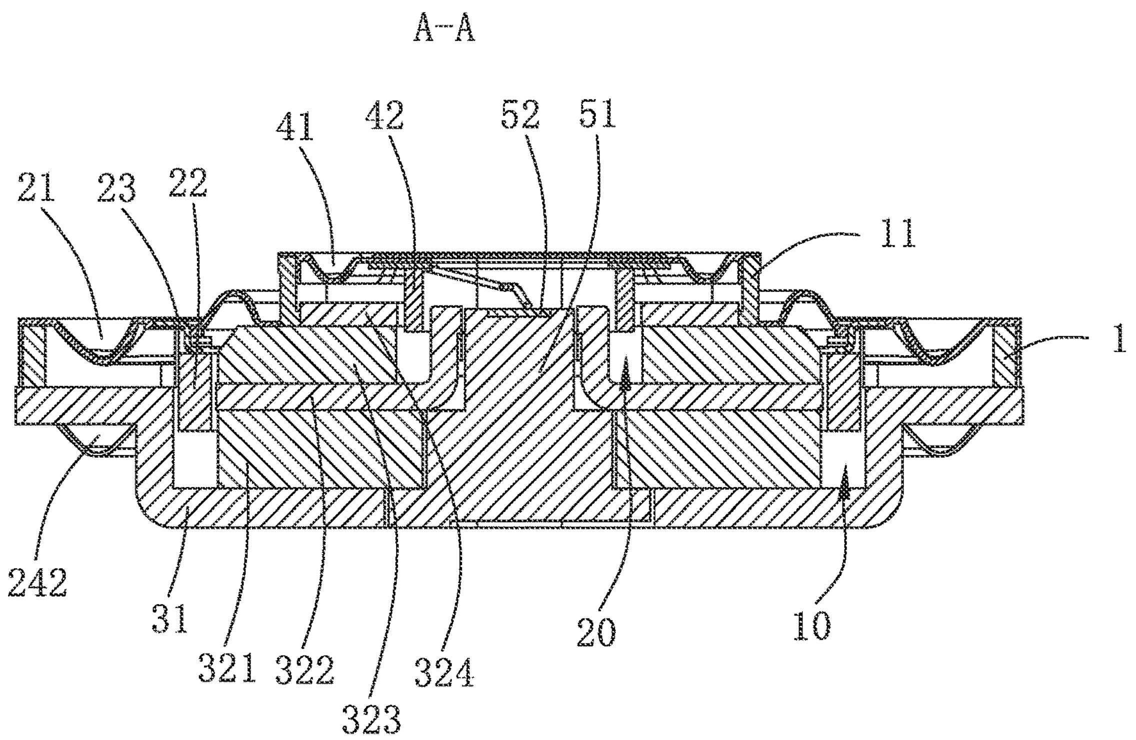
FIG. 3 is a cross-sectional view of sounding device taken along line A-A in FIG. 2.

As shown in FIGS. 1-3, an embodiment of the present disclosure provides a sounding device 100, the sounding device 100 includes a first frame 1, a first vibration system 2, a magnetic circuit system 3, a second frame 11, a second vibration system 4 and a conductive insertion member 5.

Wherein, the first vibration system 2 includes a first diaphragm 21 whose outer peripheral edge is fixed on the first frame 1, and a first voice coil 22 which drives the first diaphragm 21 to vibrate and sound. the magnetic circuit system 3 is fixed on the first frame 1, a first magnetic gap 10 and a second magnetic gap 20 are provided with space on the side of the magnetic circuit system 3 close to the first vibration system 2. The first magnetic gap 10 is arranged around the second magnetic gap 20; the first voice coil 22 is inserted and suspended in the first magnetic gap 10. The second frame 11 is fixed on the top of the magnetic circuit system 3. The second vibration system 4 includes a second diaphragm 41 whose outer peripheral edge is fixed to the side of the second frame 11 away from the magnetic circuit system 3, and a second voice coil 42 that drives the second diaphragm 41 to vibrate and sound. The second voice coil 42 is inserted and suspended in the second magnetic gap 20.

The conductive insertion member 5 is used to connect external electrical signals. The conductive insertion member 5 is fixed to the magnetic circuit system 3, and penetrates the magnetic circuit system 3 from the side of the magnetic circuit system 3 away from the first vibration system 2 to the other side thereof. Both the first magnetic gap 10 and the second magnetic gap are arranged around the conductive insertion member 5. The voice coil lead wire of the second voice coil 42 is drawn out from its inner peripheral side and extended to be electrically connected to the conductive insertion member 5.

In this embodiment, the conductive insertion member 5 includes an insertion member body 51 penetrating the magnetic circuit system 3 from the side of the magnetic circuit system 3 away from the first vibration system 2 to the other side thereof, and two conductive sheets 52 penetrating the insertion member body 51 from one side of the insertion member body 51 close to the second vibration system 4 to the other side thereof. One ends of the two conductive sheets 52 close to the second vibration system 4 are respectively fixed to the top of the insertion member body 51 and spaced apart to form a welding pad of the conductive insertion member 5. The voice coil lead wire of the second voice coil 42 is connected to the welding pad.

The voice coil lead wire of the second voice coil 42 is two, which are used as the positive lead wire and the negative lead wire of the second voice coil 42, respectively, and are respectively electrically connected to the welding pads formed by the two conductive sheets 52.

In this embodiment, the magnetic circuit system 3 includes a magnetic yoke 31 fixed on the first frame 1 and a magnetic assembly 32 fixed to the magnetic yoke 31. The magnetic yoke 31 includes a bottom wall of the magnetic yoke 311 with the through hole, and a side wall of the magnetic yoke 312 which is bent and extended from the outer peripheral side of the bottom wall of the magnetic yoke 311 and fixed to the first frame 1. The magnetic assembly 32 includes a first primary magnet 321, a pole plate 322 and a second primary magnet 323 which are all annular and are stacked and fixed on the bottom wall of the magnetic yoke 311 in sequence.

The pole plate 322 includes a pole plate body 3221 which is sandwiched between the first primary magnet 321 and the second primary magnet 323 and is in the form of a ring, and a side wall of the pole plate 3222 bent laterally away from the bottom wall of the magnetic yoke 311 by the inner circumference of the pole plate body 3221. The first primary magnet 321, the pole plate 322 and the second primary magnet 323 are arranged coaxially, the conductive insertion member 5 is inserted through the through hole of the bottom wall of the magnetic yoke 311. The first primary magnet 321 and the side wall of the magnetic yoke 312 are spaced apart to form a first magnetic gap 10, the second primary magnet 323 and the side wall of the pole plate 3222 are spaced apart to form a second magnetic gap 20. The second frame 11 is fixed to the side of the second primary magnet 323 away from the pole plate body 3221.

In addition, the magnetic assembly 32 further includes an auxiliary pole plate 324 that is stacked on a side of the second primary magnet 323 away from the pole plate body 3221 and is annular. The inner peripheral side of the second frame 11 is fixedly connected to the outer peripheral side of the auxiliary pole plate 324.

After the conductive insertion member 5 is inserted through the through hole of the bottom wall of the magnetic yoke 311, then the first primary magnet 321, the pole plate 322, the second primary magnet 323, and the auxiliary pole plate 324 pass through in sequence, thereby, it can be electrically connected to the voice coil lead wire of the second voice coil 42.

In this embodiment, the first diaphragm 21 includes a first suspension 211 that is annular, and a second suspension 212, which is arranged at intervals on the inner side of the first suspension 211 and is annular, and a first vibration part 213 which is bent and extended from the inner peripheral edge of the first suspension 211 and connected to the outer peripheral edge of the second suspension 212 and is annular. The outer peripheral edge of the first suspension 211 is fixed on the first frame 1. The inner peripheral edge of the second suspension 212 is fixed to the side of the second primary magnet 323 away from the first primary magnet 321. The first voice coil 22 is fixed to the side of the first vibration part 213 close to the magnetic circuit system 3.

The inner peripheral edge of the second suspension 212 is also fixedly connected with the outer peripheral side of the second frame 11.

In this embodiment, the first vibration system 2 further includes a skeleton 23 and an elastic support assembly 24.

Wherein, the skeleton 23 includes an annular skeleton body 231, and a fixing part of the skeleton 232 which is bent and extended from the inner peripheral edge of the skeleton body 231 to the first magnetic gap 10 and is fixedly connected with the first voice coil 22. The skeleton body 231 is fixed to the first vibration part 213 to act as the first dome.

The skeleton 23 also includes a connection part of the skeleton 233 which is formed by bending and extending its outer peripheral edge in a direction close to the magnetic circuit system 3.

The elastic support assembly 24 includes an elastic member 241 whose one end is fixed to the first frame 1 and other end is fixed to the connection part of the skeleton 233, and an auxiliary diaphragm attached to the side of the elastic member 241 away from the connection part of the skeleton 233.

In this embodiment, the second diaphragm 41 includes a second vibration part 411, a third suspension 412, which extends outward from the outer peripheral edge of the second vibration part 411 and is annular, and a second dome 413 that fits the second vibration part 411. The outer peripheral edge of the third suspension 412 is fixed on the side of the second frame 11 away from the second primary magnet 323, the second voice coil 42 is fixed to the second vibration part 411.

In addition, the second diaphragm 41 also includes a second skeleton 414 which is annular and fixed to the second vibration part 411. The second skeleton 414 is located on the side of the second vibration part 411 close to the magnetic circuit system 3. The second dome 413 is located on the side of the second vibration part 411 away from the magnetic circuit system 3. The second voice coil 42 is fixed to the side of the second skeleton 414 close to the magnetic circuit system 3.

Compared with the existing technology, in the sounding device 100 of this embodiment, the conductive insertion member 5 that runs through the magnetic circuit system 3 is added, the voice coil lead wire of the second voice coil 42 in the second vibration system 4 is drawn out from its inner peripheral side and extended to be electrically connected to the conductive insertion member 5. In this way, the second voice coil 42 can be electrically connected to the external circuit board through the conductive insertion member 5, the total extension length of both ends of the voice coil wire can be controlled by adjusting the winding process of the second voice coil 42, thereby adjusting the amplitude of the second vibration system 4.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A sounding device, including:

a first frame;

a magnetic circuit system fixed on the first frame, a first vibration system having a first diaphragm with an outer peripheral edge fixed to the first frame and a first voice coil for driving the first diaphragm to vibrate for generating sound;

a first magnetic gap formed at one side of the magnetic circuit system close to the first vibration system, in which the first voice coil is inserted and suspended;

a second magnetic gap formed at the side of the magnetic circuit system close to the first vibration system and being surrounded by the first magnetic gap;

a second frame fixed on a top of the magnetic circuit system;

a second vibration system including a second diaphragm with an outer peripheral edge fixed to a side of the second frame away from the magnetic circuit system, and a second voice coil inserted and suspended in the second magnetic gap for driving the second diaphragm to vibrate; and, a conductive insertion member fixed to the magnetic circuit system and penetrating the magnetic circuit system from one side of the magnetic circuit system away from the first vibration system to the other side for connecting an external electrical signal; wherein both the first and second magnetic gaps are disposed around the conductive insertion member; a voice coil lead wire of the second voice coil is drawn out from an inner peripheral side and extended to be electrically connected to the conductive insertion member; the conductive insertion member includes an insertion member body penetrating the magnetic circuit system from the side of the magnetic circuit system away from the first vibration system to the other side, and two conductive sheets penetrating the insertion member body from one side of the insertion member body close to the second vibration system to the other side; one ends of the two conductive sheets close to the second vibration system are respectively fixed to the top end of the insertion member body and spaced apart to form a welding pad of the conductive insertion member; the voice coil lead wire of the second voice coil is electrically connected to the welding pad.

2. The sounding device as described in claim 1, wherein, the magnetic circuit system comprises a magnetic yoke fixed on the first frame and a magnetic assembly fixed on the magnetic yoke; the magnetic yoke includes a bottom wall with a through hole, and a side wall bent and extended from an outer peripheral side of the bottom wall; the magnetic assembly includes a first primary magnet, a pole plate and a second primary magnet which are all annular and are stacked and fixed on the bottom wall of the magnetic yoke; the pole plate includes an annular pole plate body sandwiched between the first primary magnet and the second primary magnet, and a side wall of the pole plate which is bent in a direction away from the bottom wall of the magnetic yoke from the inner peripheral side of the pole plate body; the first primary magnet, the pole plate and the second primary magnet are set coaxially, the conductive insertion member is inserted through the through hole of the bottom wall of the magnetic yoke; the first primary magnet and the side wall of the magnetic yoke are spaced apart to form the first magnetic gap, the second primary magnet and the side wall of the pole plate are spaced apart to form the second magnetic gap; the second frame is fixed to the side of the second primary magnet away from the pole plate body.

3. The sounding device as described in claim 2, wherein, the magnetic assembly further includes an annular auxiliary pole plate stacked on the side of the second primary magnet away from the pole plate body; the inner peripheral side of the second frame is fixedly connected to the outer peripheral side of the auxiliary pole plate.

4. The sounding device as described in claim 2, wherein, the first diaphragm comprises a first suspension, a second suspension engaged with an inner side of the first suspension, and a first vibration part extending from an inner peripheral edge of the first suspension and connected to an outer peripheral edge of the second suspension; the outer peripheral edge of the first suspension is fixed to the first frame, the inner peripheral edge of the second suspension is fixed to the side of the second primary magnet away from the first primary magnet; the first voice coil is fixed on the side of the first vibration part close to the magnetic circuit system.

5. The sounding device as described in claim 4, wherein, the inner peripheral edge of the second suspension is fixedly connected to the outer peripheral side of the second frame.

6. The sounding device as described in claim 5, wherein, the first vibration system further includes a skeleton having an annular skeleton body, and a fixing part extending from an inner peripheral edge of the skeleton body to the first magnetic gap and fixedly connected with the first voice coil; the skeleton body is fixed to the first vibration part for serving as a first dome.

7. The sounding device as described in claim 6, wherein, the skeleton further includes a connection part bending and extending an outer peripheral edge in a direction close to the magnetic circuit system; the first vibration system further includes an elastic support assembly having an elastic member with one end thereof fixed to the first frame and the other end fixed to the connection part of the skeleton, and an auxiliary diaphragm attached to the side of the elastic member away from the connection part of the skeleton.

8. The sounding device as described in claim 2, wherein, the second diaphragm includes a second vibration part, an annular third suspension formed by the outer peripheral edge of the second vibration part extending outward, and a second dome that fits the second vibration part; the outer peripheral edge of the third suspension is fixed to the side of the second frame away from the second primary magnet; the second voice coil is fixed to the second vibration part.

9. The sounding device as described in claim 8, wherein, the second diaphragm further includes a second skeleton which is annular and fixed to the second vibration part; the second skeleton is located on the side of the second vibration part close to the magnetic circuit system; the second dome is located on the side of the second vibration part away from the magnetic circuit system; the second voice coil is fixed on the side of the second skeleton close to the magnetic circuit system.

* * * * *